United States Patent
Rasmussen et al.

[11] Patent Number: 5,979,285
[45] Date of Patent: Nov. 9, 1999

[54] APPARATUS FOR CUTTING DOUGH PRODUCTS

[75] Inventors: Glenn O. Rasmussen, Champlin; James S. Thorson, Scandia; Jimmy A. DeMars, Hugo, all of Minn.

[73] Assignee: The Pillsbury Company, Minneapolis, Minn.

[21] Appl. No.: 08/856,037

[22] Filed: May 14, 1997

Related U.S. Application Data

[63] Continuation of application No. 08/486,638, Jun. 7, 1995, abandoned.

[51] Int. Cl.$^6$ ....................................................... B26D 1/14
[52] U.S. Cl. ............................... 83/676; 83/596; 83/663; 83/672; 83/932; 241/295
[58] Field of Search ............................ 83/672, 676, 595, 83/596, 835, 663, 932, 680; 241/260.1, 295; 425/308, 315

[56] References Cited

U.S. PATENT DOCUMENTS

| | | | |
|---|---|---|---|
| 331,195 | 11/1885 | Hawley | 83/835 |
| 886,298 | 4/1908 | Johns . | |
| 1,909,029 | 5/1933 | Walter . | |
| 2,697,249 | 12/1954 | Bettes, Jr. et al. | 18/4 |
| 3,152,500 | 10/1964 | Watts | 83/663 |
| 3,225,718 | 12/1965 | Page | 107/69 |
| 3,646,894 | 3/1972 | Hasten et al. | 83/355 |
| 3,680,616 | 8/1972 | Rejsa | 146/222 |
| 3,727,504 | 4/1973 | Osterholt | 83/483 |
| 3,772,982 | 11/1973 | Smith | 83/672 |
| 3,799,019 | 3/1974 | Long et al. | 83/672 |
| 3,901,114 | 8/1975 | Cage | 83/672 |
| 3,921,485 | 11/1975 | Tobey et al. | 83/672 |
| 4,082,232 | 4/1978 | Brewer | 83/665 |
| 4,218,944 | 8/1980 | Sclippa | 83/345 |
| 4,607,800 | 8/1986 | Barclay | 241/236 |
| 4,625,782 | 12/1986 | Jameson | 83/672 |
| 4,692,109 | 9/1987 | Hayashi et al. | 425/308 |
| 4,767,304 | 8/1988 | Tashiro | 425/308 |
| 4,901,929 | 2/1990 | Barclay | 241/294 |
| 4,926,726 | 5/1990 | Julian | 83/672 |
| 5,098,273 | 3/1992 | Tashiro | 425/132 |
| 5,152,469 | 10/1992 | Dicky | 241/295 |
| 5,153,010 | 10/1992 | Tashiro et al. | 425/287 |
| 5,190,770 | 3/1993 | Tashiro | 425/132 |
| 5,318,231 | 6/1994 | Bernhardt et al. | 241/295 |
| 5,580,010 | 12/1996 | Barclay et al. | 241/294 |

FOREIGN PATENT DOCUMENTS

| | | |
|---|---|---|
| 0 304 563 | 3/1989 | European Pat. Off. . |
| 0 359 393 | 3/1990 | European Pat. Off. . |
| 0 555 190 | 8/1993 | European Pat. Off. . |
| 0 595 489 | 5/1994 | European Pat. Off. . |
| 2 565 883 | 12/1985 | France . |
| 91 14 309 | 3/1993 | Germany . |
| 93 13 506 | 11/1993 | Germany . |
| 419615 | 11/1934 | United Kingdom . |

OTHER PUBLICATIONS

Josef Müller & Söhne, *General Information About Reciprocating Frame Slicers*, undated.

Josef Müller & Söhne, *REX High Duty Slicers*, Apr. 1995.

*Primary Examiner*—M. Rachuba
*Assistant Examiner*—Sean A. Pryor
*Attorney, Agent, or Firm*—Arnold, White & Durkee

[57] ABSTRACT

An apparatus for cutting dough products fed by a conveyor assembly into a cutting section comprises a segmented, generally spiral-shaped straight cutting blade or three-dimensional or helical-shaped cutting blade having an angled blade edge, the blade attached to a shaft coupled to a motor operable to turn the blade to effect a cut of the dough products within the cutting section, with a feedback controller coordinating the blade turning rate with the dough feed rate.

22 Claims, 4 Drawing Sheets

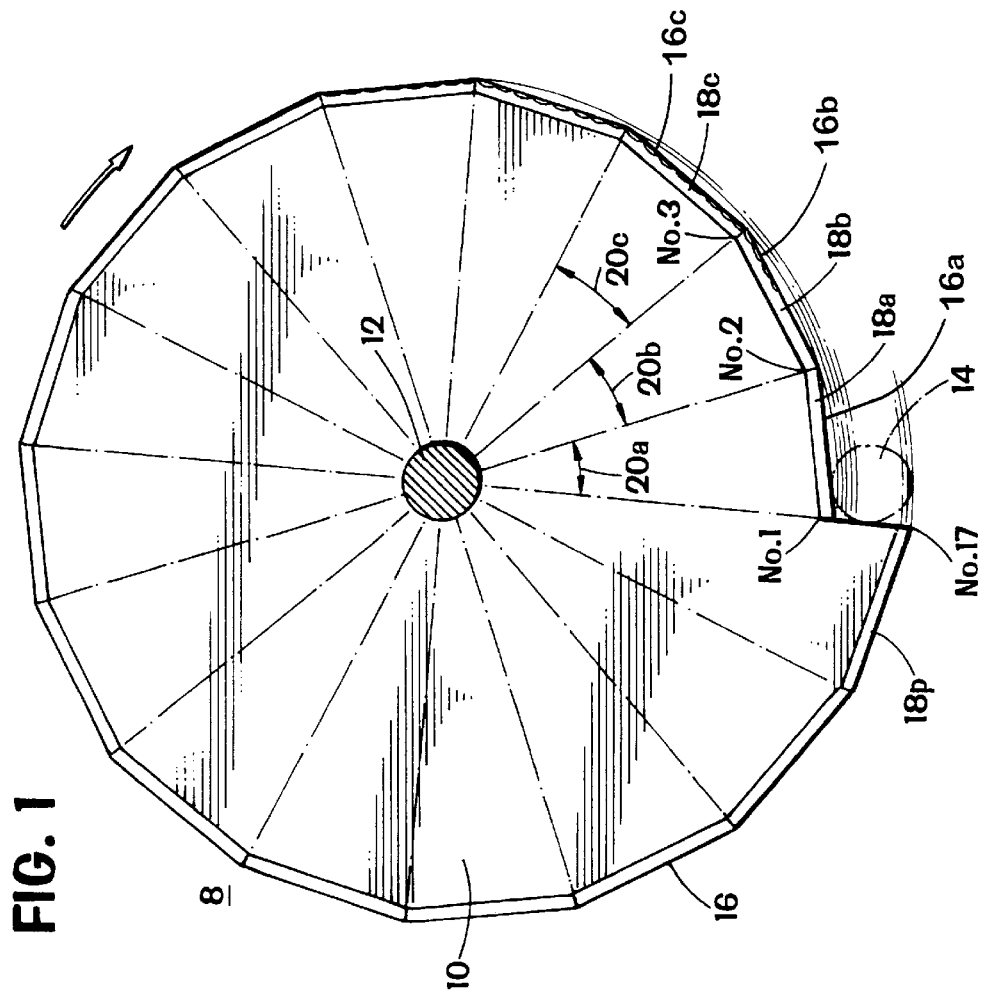
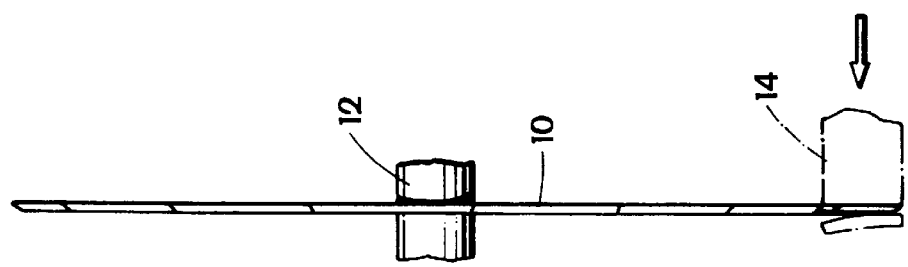
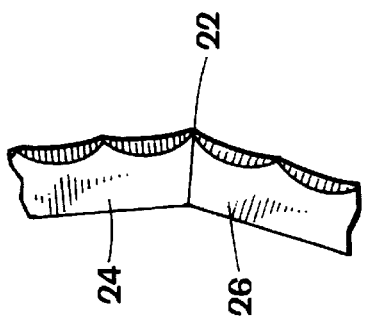
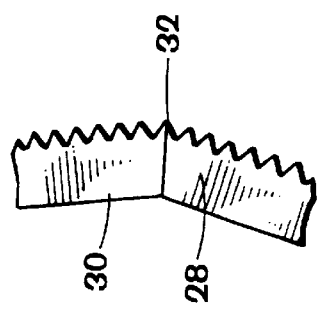

APPARATUS FOR CUTTING DOUGH PRODUCTS

This application is a continuation of application Ser. No. 08/486,638, filed Jun. 7, 1995 now abandoned.

BACKGROUND

The present invention relates generally to an apparatus and method for cutting dough products; and more particularly, relates to an assembly line apparatus capable of cutting relatively thin pieces from a continuous "rope" of dough. Although one particular preferred embodiment of the present invention, in which the apparatus comprises a generally spiral-shaped blade having a segmented, angled blade edge for cutting soft dough products, is described herein, it should be readily apparent that the method and apparatus of the present invention may also be used in other cutting applications.

Selection of a cutting tool for a particular application often depends upon a number of factors. In the case of a dough product, these factors may include, for example, the relative hardness of the dough to be cut; dough temperature and consistency; the presence of filling materials within the dough; and the desired thickness for the pieces to be cut. Numerous systems for cutting dough products are generally known. Such systems include waterjet cutters, guillotine-type knife cutters, band-saw cutters, etc. However, each of those cutting systems have significant drawbacks when it comes to soft dough cutting applications, particularly those involved in assembly line operations.

Waterjet cutters, for example, tend to work better in warm dough applications in which the dough temperature exceeds 65° F., than in cool dough applications in which the dough temperature is below 45° F. A waterjet cutter also tends to be extremely noisy during operation, and typically generates an undesirable waste stream. Further, it has been found that a waterjet cutter typically is of limited value in cutting applications involving dough containing certain filler materials. In particular, a waterjet cutter typically cannot cut through raisins, and although it can cut through nuts, the waterjet has a tendency to throw nuts out of the dough material instead. Further, in cutting soft dough products such as cinnamon or jelly rolls, it is desirable that any cut be executed cleanly so as not to smear the filling material across the cut surface. Waterjet cutters tend to smear such filling materials and thus have an undesired adverse impact on the overall appearance of the dough slices.

Bladed cutters can be used in a wider range of both warm and cool dough applications than waterjet cutters, with knives in particular tending to cut better in cold dough applications. Typically, slices greater than 0.75 inches thick can be cut from up to a four inch diameter dough rope with the use of a guillotine-type knife cutter. To enhance the attractiveness of the product slice, it is preferable that the cutting apparatus not deform the typically round or spheroidal shape of the dough product during a cut. However, a guillotine cutter naturally has a tendency to pinch the dough and to deform the product slices. Deformation occurs because the knife edge presses down hard on the product until the product fails under the contact. Thus, to make thinner dough slices (0.75 inches or less), the typical guillotine-type cutter does not work well. The pressure applied on the product slice tends to destroy its shape, i.e. crushing the slice because of its relatively thin size.

Saw-like cutters also have been used in some dough-cutting applications. However, they too tend to exhibit undesirable characteristics when used in soft dough applications. For example, soft dough is often sticky, and it tends to adhere to the back of the cutting blade as it moves through the product. Further, instead of cutting the dough, the saw-like cutter tends to pull dough from its path, deforming the dough product and slices in the process. Although these undesirable effects can be reduced somewhat by lubricating and cleaning the cutting blade with oils, an improved cutting apparatus and method which reduces or eliminates the need for such measures clearly would be preferable.

SUMMARY OF THE INVENTION

As explained in more detail below, the present invention overcomes the above-noted and other shortcomings of prior devices and methods for cutting soft dough products.

In accordance with an assembly line usage of the present invention, a cutting blade is rigidly attached to a shaft operatively coupled to a drive assembly operable to turn the blade. The shaft is aligned parallel to and above a conveyor assembly which functions to feed a "rope" of dough to be cut through a cutting section. The feed of dough through the cutting section generally can be either continuous (typically requiring a three dimensional or helical spiral blade) or indexed (typically requiring a straight spiral blade), with the former being preferred for most applications. Of course, the choice of either a helical or straight spiral blade will depend upon the particular circumstances surrounding the application involved. For example, a straight spiral blade may be used for a continuous dough feed application where the blade travels through a cutting section with the dough. Accordingly, it should be understood that the present invention is not limited only to the description of the embodiments set forth herein, i.e. straight and helical spiral blades used to cut a continuous dough feed in an assembly line environment.

Thus, in accordance with the preferred embodiment, the helical blade used in conjunction with the continuous dough feed is oriented along its shaft in a generally three-dimensional spiral shape from the beginning of the cutting section to the end, so that as the dough rope travels through the cutting section, the continuous turning of the blade results in the rope being cut into a series of pieces.

Preferably, a control assembly is used to coordinate the turning rate of the blade with the rate of travel of the dough through the cutting section, so that any transient increase or slowdown in dough speed which may occur (for example, due to changes in conveyor speed) is matched by an appropriate increase or slowdown in the turning of the blade. The helical spiral blade preferably has a pitch corresponding to the desired thickness of the dough slices to be cut.

The preferred helical blade generally has a screw-like shape, somewhat resembling a seashell in appearance, with a blade edge resembling a series of chords aligned end to end along an imaginary three-dimensional spiral. The edge of the blade may be either straight or curved, and may or may not be scalloped or serrated along its length. The blade is segmented, meaning that it will appear to have "points" located along the path resembling a three-dimensional spiral, and thus may have a serrated look even if the edge itself is not serrated. Each segment may be linear (i.e., a chord to the generally circular contour of the blade), or may be an arcuate segment having a radius greater than the nominal radius of the generally circular blade contour. The blade need not have sharp angles at each point, although such an arrangement is preferred for soft dough applications. The location where the ends of adjacent chords meet may be of a variety of shapes, i.e. a sharp angle, a smooth curve, squared off, etc. Further, the blade also may have a cutting edge that is angled toward the oncoming section of dough that is to be cut.

The cutting edge of the blade is angled to minimize the surface area available for the dough to rub against.

Only the portions of the blade edge near the blade points, corresponding to the trailing portion of each chord as the blade rotates, contacts dough in making a complete cut. Due to the spiraling nature of the blade, each chord cuts through approximately the same radial thickness of dough material, with subsequent chords along the blade edge cutting at an increasing distance from the shaft. Further, when the shaft is turned at a constant rate, the cutting speed naturally increases through the cutting section.

Because the primary contact between the dough and the cutting blade is at the cutting tips or points, the soft dough is able to spring back rather than deform when a cutting tip passes through. The amount of downward and pulling force on the dough product is reduced. Thus, the problems of the product slice being compressed or crushed, and of friction on the inside of the blade, are practically eliminated.

In an assembly line application, the cutting system of the present invention can cut much faster than the other cutting systems noted above. Further, the on-line cleaning requirements for the blade are reduced as compared with the other cutting systems. With the prior systems, cleaning often is achieved by the continual spraying of oils on the blade. With the present invention, the need to spray oils is minimized, if not eliminated altogether.

Literature from the Josef Müiller & Sohne company of Germany regarding their "Rex" reciprocating frame slicers discloses a spiral blade generally. The publication discusses the use of a spiral blade for cutting breads and cakes, expressly including delicate and sticky types of cake. As best as can be discerned from the brochure, however, the disclosed blade does not appear to have a segmented blade edge, an angled blade edge, or any of the other desirable traits associated with the cutting system of the present invention.

Examples of the more important features of this invention have been broadly outlined above in order that the detailed description that follows may be better understood and so that contributions which this invention provides to the art may be better appreciated. There are, of course, additional features of the invention which will be described herein and which will be included within the subject matter of the claims appended hereto.

BRIEF DESCRIPTION OF THE DRAWINGS

FIG. 1 is an illustration of a exemplary dough cutting assembly in accordance with the present invention, depicted in a side view.

FIG. 2 is an end view of the exemplary dough cutting assembly shown in FIG. 1.

FIG. 3 is an illustration of an exemplary cutting point of a scalloped blade edge of a dough cutting assembly in accordance with the present invention.

FIG. 4 is an illustration of an exemplary cutting point of a serrated blade edge of a dough cutting assembly in accordance with the present invention.

DETAILED DESCRIPTION OF THE INVENTION

Figure 10:
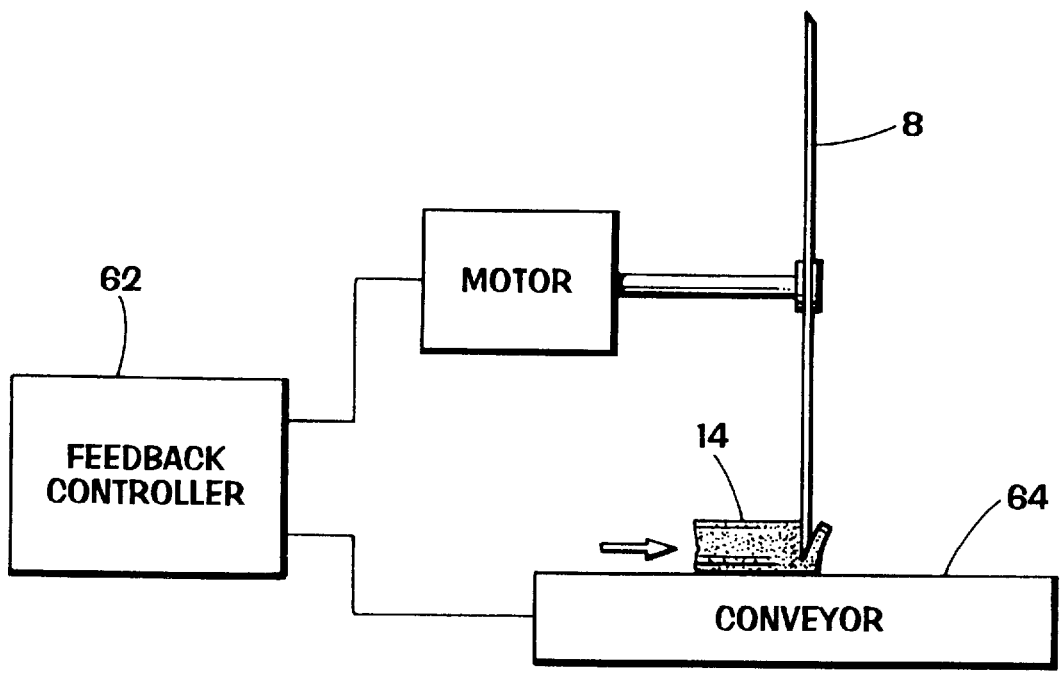
FIG. 10 is an illustration of a dough cutting assembly in accordance with the present invention, depicted in a schematic view.

An exemplary dough cutting assembly comprising a straight spiral blade 8 is generally shown in FIGS. 1–8. A generally flat blade body 10 comprises a spiral-shaped relatively planar section adapted for coupling to a shaft 12. Preferably, the shaft 12 is fixedly attached to the blade body 10. The shaft 12 is operatively coupled to a drive assembly (See FIG. 10) capable of rotating the shaft to turn the blade 8 to effect a desired cut in a dough product 14. Typically, the dough product 14 comprises a long "rope" of soft dough material fed through a cutting section by a conveyor assembly, as is commonly found in many food processing assembly line applications today.

The blade 8 further includes a blade edge 16 comprising a series of chord-like edge sections 16a, 16b, 16c, etc. As shown in FIG. 1, blade 8 includes straight chord-like segments 18a–p; however, the number of chord-like segments and their shape may vary depending upon the particular application in which the blade 8 will be used. Generally, though, each edge section 16a–p will resemble a chord having ends that lie along a spiral path running through the points at which adjacent chords are joined.

As shown in FIG. 1, the chord-like segments 18–p could be described by angles 20a, 20b, 20c, etc. with vertices at the center of the spiral path running through the points at which adjacent chords are joined. In FIG. 1, the angles 20a, 20b, . . . ,20p are shown as being equivalent, although this need not necessarily be the case.

The chord-like segments 18 may be integrally formed with the blade body 10, as in the case in which a circular piece of body material is cut and ground to the desired segmented spiral shape. The chord-like segments 18 also may be added to a previously formed blade body 10 by welding or other such processes. Preferably, the blade body 10 and chord-like segments 18 are integrally formed from one of any of a number of stainless steel materials suitable for and typically used in food processing applications.

As shown in FIGS. 3 and 4, the edge sections 16 may come in a variety of shapes. The selection of a particular edge finish and shape will depend upon the application in which the cutting assembly is to be used. By way of example, however, FIG. 3 shows a cutting point 22 located between adjacent chord-like segments 24,26 in which the segments 24,26 have a finished edge that is scalloped, much like the type of edge found on many bread knives in use today; and FIG. 4 shows an exemplary cutting point 32 defined by adjacent chord-like segments 28,30 having a serrated edge.

The cutting blade shown in FIG. 1 comprises a total of seventeen blade points (labeled No. 1, No. 2, No. 3, and No.

17) about the cutting edge 16. As the blade 8 is rotated about its center, each blade point will swing through a circular path. Where a particular circular path for a blade point intersects the dough log 14, a cut of the dough log will be made.

Figure 5:
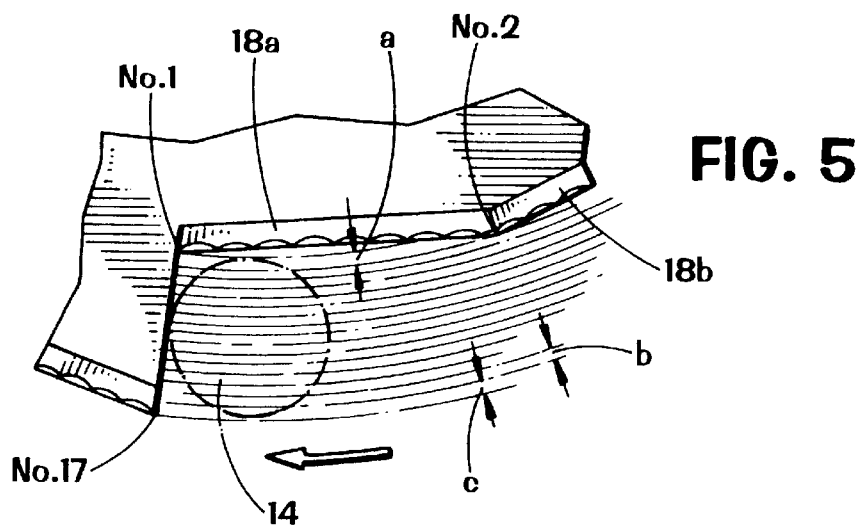
FIG. 5 is an illustration of the cutting passes made through a dough product by the cutting points of the exemplary dough cutting assembly shown in accordance with the present invention.

As shown in FIG. 5, blade point No. 1 makes an idle cutting pass, i.e. no cut, since its path fails to intersect any portion of dough log 14. Thus, for the embodiment shown, blade point No. 2 is the first blade point to effect any cut of dough log 14.

The first cutting pass (which is made by blade point No. 2) will make a cut in the dough log 14 to a depth denoted "a" in FIG. 5. For most soft dough applications the distance "a" will be approximately 0.125 to 0.375 inches, although the exact distance may vary depending upon the particular application involved.

Following the cut made by blade point No. 2, for a blade having a regular spiral shape, the next fourteen cutting passes made by blade points 3–16 will make equal cuts of a depth "b" in dough log 14 (see FIG. 5). The depth of any one of these cuts can be determined by comparing the radii of the path circles defined by adjacent blade points, with the difference in radial distance corresponding to the depth of the cut made. Of course if the spiral corresponding to the blade points is not a regular spiral, then each of the fourteen cutting passes will not cut the same depth. Although a regular spiral blade is generally preferred for most soft dough applications, other shaped blades may be used depending upon the particular application involved. For illustrative purposes, FIG. 6 shows an exemplary cutting pass through dough log 14 made by blade point No. 6.

The final cut in dough log 14 is made by the cutting pass defined by blade point No. 17. In the majority of applications the depth of this cut should be sufficient to effect a complete cut through dough log 14. To ensure that a complete cut is made, it is preferred that the trailing end of chord-like segment 18*p* be angled outward somewhat, so that the final cutting pass distance "c" will be greater than or equal to the cutting pass distance "b" (see FIG. 5). Again, however, the exact choice of cutting distances is application specific. Thus, the exact relationship between the distances "a", "b", and "c" shown in FIG. 5 may vary.

Figure 6:
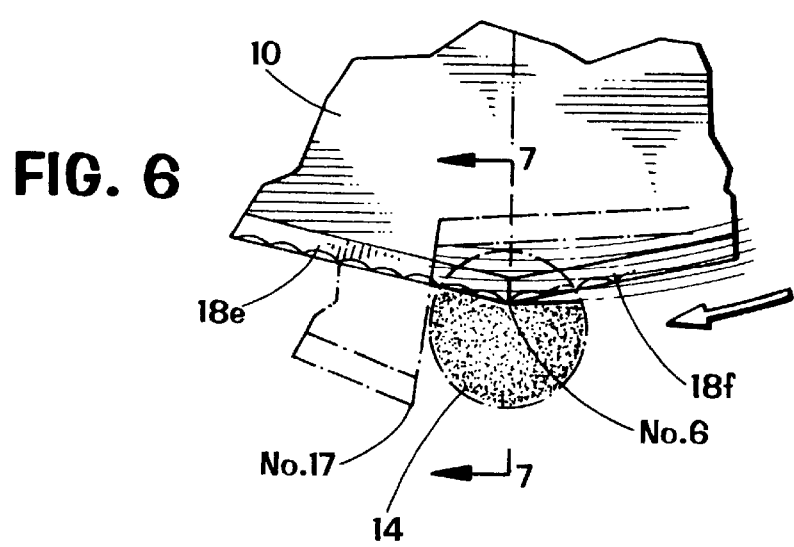
FIG. 6 is an illustration of an exemplary cutting pass shown in FIG. 5 which depicts an exemplary cutting point traveling through the dough product.
Figure 7:
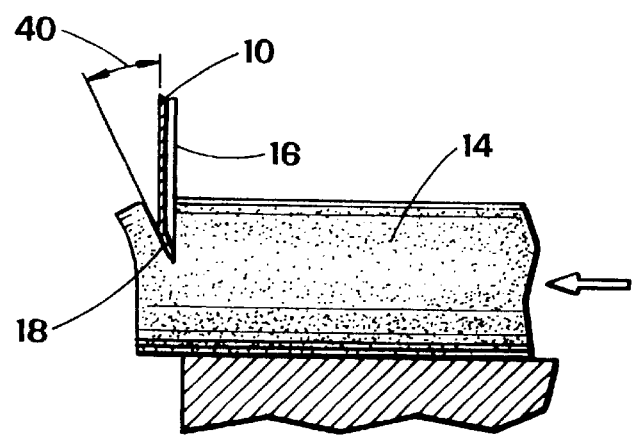
FIG. 7 is a cross-sectional view of the apparatus depicted in FIG. 6, taken along the line 7—7 in FIG. 6.

FIG. 7 is an cross-sectional view of the apparatus shown in FIG. 6, taken along the line 7—7 in FIG. 6, illustrating the preferred arrangement of the chord-like segments 18. As shown in the drawing, the chord-like segments 18 preferably are angled toward the dough log 14, so that each of the blade points No. 1, No. 2, . . . , No. 17 will be in a plane other than the plane generally defined by blade body 10. The angle 40 corresponding to the angle between the blade body 10 and chord-like segments 18 may vary depending upon the particular application involved. Typically, however, for most soft dough applications the angle 40 will be approximately between about 9 and about 15 degrees.

Figure 8:
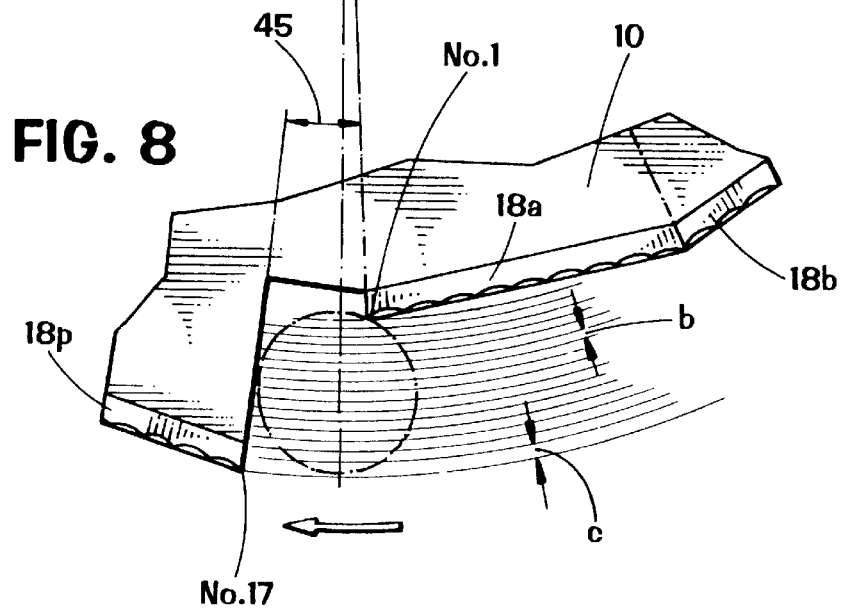
FIG. 8 is an illustration of an exemplary dough cutting assembly in accordance with the present invention, depicting an offset first cutting point.

FIG. 8 illustrates an alternative embodiment of the cutting assembly of the present invention in which an offset 45 is introduced between blade points No. 1 and No. 17. Adapting the blade 8 with an offset 45 permits blade point No. 1 to be transformed into an effective cutting point. Again, whether this particular type arrangement is used would depend upon the circumstances involved in a particular application.

Figure 9:
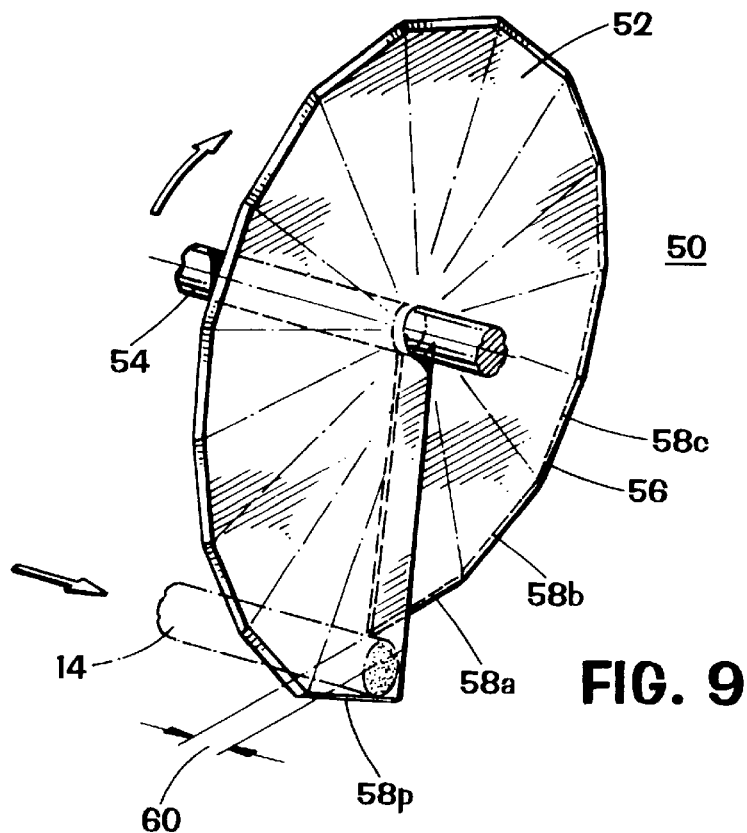
FIG. 9 is an illustration of an exemplary helical dough cutting assembly in accordance with the present invention.

FIG. 9 shows an exemplary helical segmented spiral blade 50 in accordance with the present invention. The segmented blade 50 comprises a three-dimensional spiral body 52 operatively coupled to a shaft 54 and a drive assembly (not shown in FIG. 9; see FIG. 10). A generally conventional feedback controller 62 may be employed to coordinate the speed of rotation of the blade 50 with the rate of travel of conveyor 64 carrying the dough log 14 through the cutting section to permit a single cut to be made in the dough log 14 and to yield a piece of dough of the desired thickness. The blade edge 56 of spiral blade 50 is defined by chord-like segments 58*a*, 58*b*, 58*c*, . . . , 58*p* much like the chord-like segments 18*a*, 18*b*, 18*c*, . . . , 18*p* discussed above, e.g. the chord-like segments may be described by their respective angles, the chord-like segments may be angled toward the oncoming dough, etc. Due to the pitch 60 in blade 50, each of the blade points between adjacent chords defines a circular cutting path in a plane separate from the cutting path planes of other blade points. To achieve a ⅜ inch product slice using a blade with a diameter of 24 to 32 inches, a pitch or offset of between about ⅜ inch and about ¾ inch may be used, with a ½ inch offset being preferred for most soft dough applications. Thus, with a continuous rotation of the blade and a continuous feed of dough, this particular embodiment is well-suited for an assembly line operation.

Although the preferred embodiment of this invention has been described hereinabove in some detail, it should be appreciated that a variety of embodiments will be readily available to persons utilizing the invention for a specific end use. The description of the apparatus and method of this invention is not intended to be limiting on this invention, but is merely illustrative of the preferred embodiment of this invention. Other apparatus and methods which incorporate modifications or changes to that which has been described herein are equally included within this application. Additional objects, features and advantages of the present invention will become apparent by referring to the above description of the invention in connection with the accompanying drawings.

What is claimed is:

1. An assembly for cutting dough products, comprising:
   a generally spiral-shaped blade having an outer edge and a rotational axis, said outer edge including a plurality of chord segments, each of said chord segments having an edge section disposed generally parallel to a tangent of said rotational axis, said blade fixedly attached to a rigid shaft; and
   a drive assembly operatively coupled to said shaft, said drive assembly operable to turn said shaft to rotate said blade to effect a cut of said dough products.

2. The assembly of claim 1, wherein at least one of said plurality of chord segments is angled relative to a body of said spiral-shaped blade.

3. An assembly for cutting dough products comprising:
   a blade including a segmented, generally helical-shaped outer edge and a central rotational axis, said outer edge defined by a plurality of joined chord blade segments, each of said plurality of chord blade segments having an edge
   section disposed generally parallel to a tangent of said central rotational axis, the blade fixedly attached to a rigid shaft; and
   a drive assembly operatively coupled to said shaft, said drive assembly operable to turn said shaft to rotate said blade to effect a cut of said dough products.

4. The assembly of claim 3, wherein at least one of said edge sections is an angled blade edge.

5. A cutting apparatus, comprising:
   a blade assembly, said blade assembly comprising a blade having a central rotational axis and a generally arcuate cutting surface having a first end and a second end, said arcuate cutting surface comprising a plurality of chord blade segments having edge sections disposed generally parallel relative to a tangent of said central rotational axis to collectively form said generally arcuate cutting surface.

6. The cutting apparatus of claim 5, wherein said first and second ends of said blade are offset from one another.

7. The cutting apparatus of claim 5, wherein said first and second ends of said blades are circumferentially offset from one another.

8. An assembly for cutting dough products comprising:

a blade having a central rotational axis and a generally spiral periphery defined by a series of adjoining chord blade segments, each of said chord blade segments including an edge section disposed generally perpendicular to a tangent of said central rotational axis, the blade fixedly attached to a rigid shaft; and a drive assembly operatively coupled to said shaft, said drive assembly operable to turn said shaft to rotate said blade to effect a cut of said dough products.

9. An assembly for cutting dough products comprising:

a blade having a segmented, generally helical-shape defined by a plurality of chord blade segments extending generally tangentially to the outer periphery of said helical-shape, said chord blade segments joined end to end along said outer periphery, the blade fixedly attached to a rigid shaft; and a drive assembly operatively coupled to said shaft, said drive assembly operable to turn said shaft to rotate said blade to effect a cut of said dough products.

10. An assembly for cutting dough products comprising:

a blade including a central rotational axis and a segmented, generally helical-shaped outer periphery defined by a plurality of joined chord blade segments, each of said chord blade segments including an edge section disposed generally perpendicular to a tangent of said central rotational axis, the blade fixedly attached to a rigid shaft; and a drive assembly operatively coupled to said shaft, said drive assembly operable to turn said shaft to rotate said blade to effect a cut of said dough products.

11. The assembly of claim 9, wherein said blade has an angled blade edge.

12. The assembly of claim 10, wherein said blade has an angled blade edge.

13. The assembly of claim 1, wherein said edge sections of said plurality of chord segments are scalloped.

14. The assembly of claim 1, wherein said edge sections of said plurality of chord segments are serrated.

15. The assembly of claim 3, wherein said edge sections of said plurality of chord blade segments are scalloped.

16. The assembly of claim 3, wherein said edge sections of said plurality of chord blade segments are serrated.

17. The apparatus of claim 5, wherein said edge sections are scalloped.

18. The apparatus of claim 5, wherein said edge sections are serrated.

19. The assembly of claim 8, wherein said edge sections of said plurality of chord segments are scalloped.

20. The assembly of claim 8, wherein said edge sections of said plurality of chord segments are serrated.

21. The assembly of claim 10, wherein said edge sections of said plurality of chord blade segments are scalloped.

22. The assembly of claim 10, wherein said edge sections of said plurality of chord blade segments are serrated.

* * * * *